(12) United States Patent
Piske et al.

(10) Patent No.: US 6,313,912 B1
(45) Date of Patent: Nov. 6, 2001

(54) LASER LEVELING INSTRUMENT WITH A LEVELING BASE AND FINE SELF-LEVELING OF THE LASER BEAM

(75) Inventors: Wilfried Piske, Heerbrugg (CH); Gerhard Predl, Goetzis (AT); Heinz Bernhard, Berneck; Martin Koeppel, Widnau, both of (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 09/171,842
(22) PCT Filed: Apr. 26, 1997
(86) PCT No.: PCT/EP97/02172
 § 371 Date: Oct. 28, 1999
 § 102(e) Date: Oct. 28, 1999
(87) PCT Pub. No.: WO97/41405
 PCT Pub. Date: Nov. 6, 1997

(30) Foreign Application Priority Data

Apr. 30, 1996 (DE) ............................... 198 17 212

(51) Int. Cl.⁷ ........................................ G01C 9/06
(52) U.S. Cl. ........................................ 356/149; 33/366.12
(58) Field of Search ................................ 356/143, 148, 356/149, 250; 33/283, 295, 366.12

(56) References Cited

U.S. PATENT DOCUMENTS

| | | | |
|---|---|---|---|
| 4,717,251 | * 1/1988 | Wells et al. | 356/149 |
| 4,811,491 | * 3/1989 | Phillips et al. | 33/366 |
| 4,949,467 | 8/1990 | Oman et al. | 33/366 |
| 5,406,713 | * 4/1995 | Oman et al. | 33/366 |
| 5,417,312 | * 5/1995 | Tsuchitani | 188/181 A |
| 6,104,211 | * 1/2000 | Middleton et al. | 356/250 |

FOREIGN PATENT DOCUMENTS

| | | |
|---|---|---|
| 2944408 | 12/1980 | (DE) . |
| 4012674 | 11/1991 | (DE) . |

OTHER PUBLICATIONS

Dissertation by H. Wüller, D 82 Diss. TH Aachen, (1988), ISSN 0515–0574.

Patent Abstracts of Japan, vol. 010, No. 072 (P–438), Mar. 22, 1986 & JP 60–210709 A (Toukiyou Kougaku Kikai KK), Oct. 23, 1985.

* cited by examiner

Primary Examiner—Richard A. Rosenberger
(74) Attorney, Agent, or Firm—Foley & Lardner

(57) ABSTRACT

A laser levelling instrument with a levelling base (7) and fine self-levelling of the laser beam (10) has an inner cylinder (5) which bears aligning elements and is suspended in an oscillating manner inside an outer cylinder (1). The laser levelling instrument is characterized in that the outer cylinder (1) and the inner cylinder (5) form a capacitor system with opposite electrode faces; the outer cylinder (1) is joined at right angles to the base (7) and is centred with respect to the beam axis (11); and signals for detecting the oscillating position of the inner cylinder (5) may be derived from the capacitor system.

15 Claims, 2 Drawing Sheets

LASER LEVELING INSTRUMENT WITH A LEVELING BASE AND FINE SELF-LEVELING OF THE LASER BEAM

BACKGROUND OF THE INVENTION

The invention relates to a laser leveling instrument having a beam platform that can be leveled and fine self-leveling of the laser beam, having an inner cylinder which is oscillatingly suspended in an outer cylinder and which carries orientation elements.

Laser leveling instruments are known in a multiplicity of designs. They serve either for the generation of a laser beam oriented perpendicularly to the vertical or for the generation of a horizontal reference plane with the aid of a laser beam rotating about the vertical direction. Within this context, the beam platform is understood to be a mounting surface of the laser leveling instrument, which mounting surface can be leveled manually with a limited degree of accuracy and on which mounting surface the means deflecting the laser beam into the horizontal are disposed.

Usually, the laser is incorporated into the laser leveling instrument in such a way that its optical axis extends in the vertical direction. The deflection into the horizontal takes place by means of mirrors or prisms, in particular by means of rotatably mounted pentaprisms. The mounting surface for the deflecting elements is, in accordance with the above definition, the beam platform.

In the case of known laser leveling instruments, this beam platform is fixedly connected to the housing of the system. For coarse leveling, the housing has adjusting feet and bubble levelers.

An arrangement for automatic coarse leveling is also known, in which the laser leveling instrument is disposed on an electromechanical stand. The legs of the stand are altered in their height by means of spindles, until such time as this procedure is terminated by mercury switches at the leveling instrument housing, which function as inclination sensors. The coarse leveling takes place with a degree of accuracy of approximately 50" and is relatively slow.

Where the accuracy requirements are more stringent, a fine leveling takes place by means of a compensator. In this case, an optomechanical compensation using lenses which are displaceable relative to one another has in particular become well established. One of the lenses is incorporated in a cylindrical tube, fixedly within the system, and the other is suspended on metal filaments, in oscillating fashion in the tube. When an instrument has been adjusted, the beam emitted by the laser extends in the optical axis of the fixedly incorporated lens and is diverted by the oscillating lens in such a way that it falls, in a vertical direction, onto the deflecting element. Where semiconductor lasers are used, the lenses are also responsible for the beam collimation. In this case, it is also possible to suspend the entire lens combination in oscillating fashion, as can be seen from DE-OS 2 944 408 to which reference is made hereinbelow.

The oscillatingly suspended lens can cooperate with three light barriers fitted to the housing. The light barrier signals can drive light emitting diodes, which are fitted in star shaped fashion to the instrument housing and thus provide the user with a correlation for the adjustment of the foot screws for coarse leveling. They replace the otherwise usual circular levels. It has also been proposed to use the signals for the adjustment of the abovementioned electromechanical stand. To this end, however, the light barriers must be oriented in aligned fashion in relation to the legs of the stand.

The range of compensation is limited by the space available within the compensator tube. During the measurement, the oscillatingly suspended lens must not touch the internal surface of the tube. Accordingly, the abovementioned light barriers serve in particular also to monitor the free oscillatory suspension. An interruption of the light barrier beam with a drop in level to a predetermined threshold leads to a denergization of the laser diode. Only after repeated coarse leveling can the system be operated again.

The oscillating lens can also swing so strongly, by reason of vibrations, that it interrupts the light barrier. In order to avoid this, a magnetic damping is provided, which compels a rapid decay of the oscillatory swing. The damping operates in the manner of an eddy current brake. In this case, it has to be ensured, by careful selection of materials and design, that magnetic forces do not influence the vertical orientation of the oscillation in the neutral position.

A summary representation of the abovementioned prior art is found in the dissertation by H. Wuller, D 82 Diss. T H Aachen, (1988), ISSN 0515–0574, development and investigation of a rotary leveling instrument and of a photoelectric leveling staff for the automation of the geometric leveling element.

DE-OS 2 944 408 discloses a pendulum compensator in which an oscillatingly suspended inner cylinder swings with the compensation lenses in an outer cylinder. The cylinders are relatively long and have a small intermediate space. In the event of alteration of the spacing of the cylinder surfaces, air is displaced, which, by reason of the flow resistance, generates a damping of the oscillatory swing.

The outer cylinder is electrically insulated with respect to the housing. In the event of contact of the inner cylinder with the outer cylinder, a wire is grounded and the laser diode is immediately deenergized thereby. To recommence operation, it is necessary to carry out a repeated coarse leveling with the use of level indicators; this restores the pendulum to its working range.

In place of compensation lenses it is also possible to fit the laser diode to the pendulum.

SUMMARY OF THE INVENTION

The object of the invention was to provide a pendulum compensator for a laser leveling instrument, which compensator is of robust and simple construction and generates an actuating signal for the coarse leveling, even when the inner cylinder is resting on the outer cylinder. In particular, the pendulum compensator should be connected to the beam platform in such a way that motor driven leveling as a function of the actuating signals is possible with a high degree of accuracy.

In the case of a laser leveling instrument of the initially mentioned type, this object is achieved, according to the invention, by the characterizing features described herein. Advantageous further developments are evident from the features of the subclaims.

According to the invention, the pendulum compensator known per se with outer and inner cylinders is designed as a capacitor having capacitance values which are locally variable as a result of the pendulum movement. The geometric conditions of the cylinder system do not alter in this case, so that the damping properties are maintained. The segmentation of one of the electrode surfaces permits an unambiguous directional correlation for the pendulum swing. In principle, two capacitor segments are sufficient for this purpose. However, subdivision into three or four segments has proved to be more expedient.

The system is extremely robust. If one of the electrode surfaces is provided with an electrically insulating layer, there can be no short circuit between the electrodes and the capacitance can be determined even when the pendulum is resting on the outer cylinder. If, in each instance, a fixed larger capacitance is connected in series with the individual capacitor segments or the inner cylinder, which acts as counterpole, even a short circuit between the electrode surfaces does not disturb the measurement. For the necessary electronic wiring of the electrode segments, it is expedient if these are disposed in the stationary outer cylinder.

The measurement of the current capacitance values advantageously takes place in rapid succession one after the other. In the circumstances, it is possible to use the same measurement and evaluation electronic system for all measurements, so that drifts of the capacitances, of the amplifiers etc. act in the same way on all measured values. Since the pendulum alterations are comparatively sluggish in comparison with the measured value interrogation, the measured values are obtained virtually simultaneously.

A particularly advantageous application of the pendulum compensator according to the invention arises if the beam platform is mounted in levelable fashion within the laser leveling instrument and can be adjusted by means of actuator motors as a function of the signals of the capacitor system until such time as the pendulum swings freely.

BRIEF DESCRIPTION OF THE DRAWINGS

In the text which follows, the invention is described in greater detail with reference to an illustrative embodiment which is diagrammatically represented in the drawing. In detail.

DETAILED DESCRIPTION OF THE PREFERRED EMBODIMENTS

Figure 1:
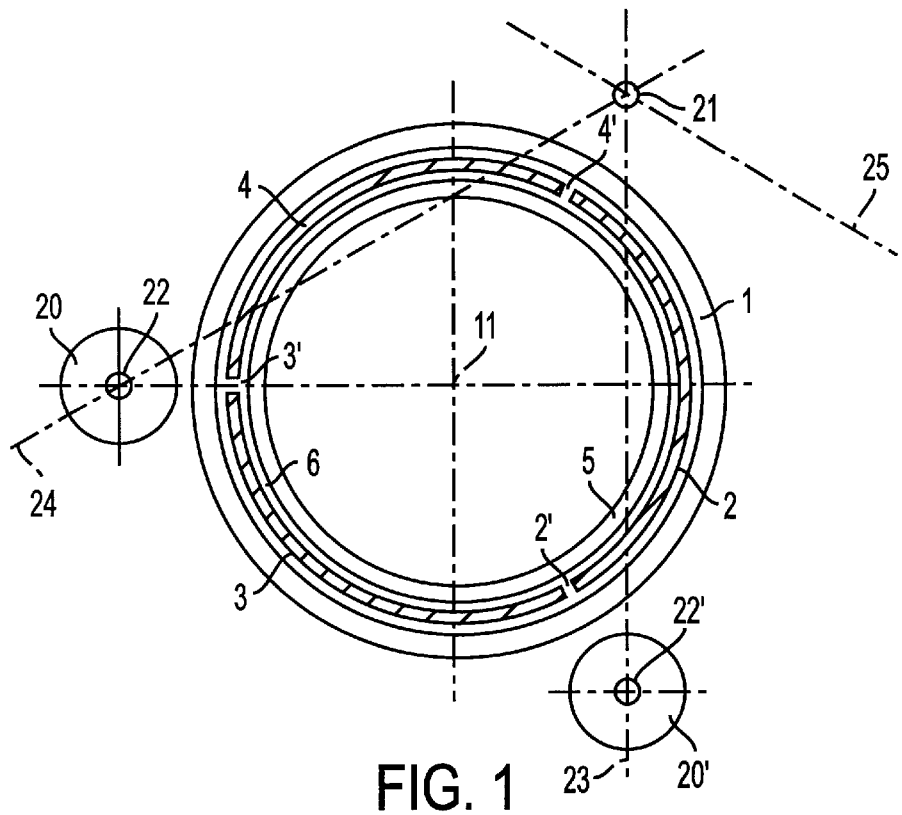
FIG. 1: shows a cross section through the capacitor system

FIG. 1 shows, in cross section, an outer cylinder 1, on whose internal surface three electrode segments 2, 3, 4 are fitted. The electrode segments are separated from one another by webs 2', 3', 4' extending perpendicular to the plane of the drawing. The webs and the adhesion bridge to the outer cylinder 1 are filled out with an electrically insulating, hardenable adhesive. An inner cylinder 5 lies at a small spacing opposite to the electrode segments. The inner cylinder is produced from electrically conducting material and forms the counter electrode to the electrode segments 2, 3, 4. The gap 6 between inner cylinder 5 and electrode segments 2, 3, 4 represents the maximum pendulum path of the inner cylinder. Further elements in FIG. 1 are described in conjunction with FIG. 2.

Figure 2:
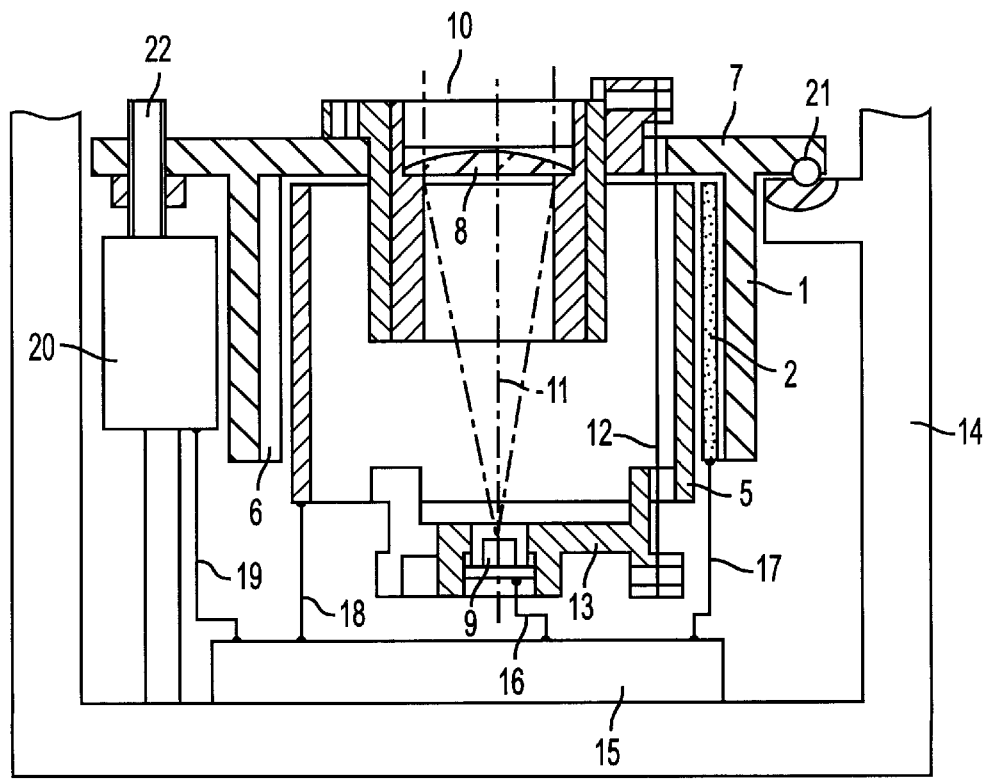
FIG. 2: shows a longitudinal cross section through the pendulum compensator

The function of the pendulum compensator is evident from the longitudinal cross section of FIG. 2. The outer cylinder 1 is secured vertically to a beam platform 7. A lens 8 is inserted into the latter. A laser diode 9 is disposed at the focus of the lens 8, so that the laser beam 10 emerging from the beam platform is parallel. The beam axis is designated by 11. The means deflecting the laser beam 10 perpendicularly to the beam axis 11 are not shown. They are secured in a manner known per se to the beam platform 7.

The lens 8 and the diode laser 9 are disposed in such a way that the beam axis 11 forms the axis of symmetry of the capacitor system 1 to 5. The inner cylinder 5 is suspended on three wires 12 secured symmetrically to the beam platform 7. To this end, there is situated at the lower end of the inner cylinder 5 a mounting plate 13 on which also the diode laser 9 is secured. It can be oriented with the aid of adjusting means (not shown) in such a way that, when the orientation of the beam platform 7 is level, it lies precisely at the focus of the lens 8. The wires 12 are to be secured in such a way that, likewise when the orientation of the beam platform 7 is level, the inner cylinder 5 hangs concentrically to the outer cylinder 1.

In the case of a slight inclination of the beam platform 7, the mounting plate 13 secured to the inner cylinder 5 and thus also the laser diode 9 can move out, within the slight free pendulum path predetermined by the gap 6, transversely to the beam axis 11. In this case, however, the laser diode 9 continues to be situated at the focus of the lens 11 [sic], so that the beam direction of the beam 10 emerging from the beam platform does not alter.

In the case of a greater inclination of the beam platform 7, the inner cylinder 5 abuts against the electrode segments 2, 3, 4. The aforementioned directional compensation is then no longer operative. In order to prevent an electrical short circuit of the inner cylinder with the electrode segments, either at least one of the electrode surfaces is to be provided with an electrically insulating coating or the circuitry measures described hereinbelow are to be adopted, so that the capacitance measurement according to the invention remains operative in all pendulum positions.

The beam platform 7 together with the pendulum capacitor is situated in a housing 14 of the laser leveling instrument. Usually, the latter possesses adjusting feet (not shown) on its base surface. The electronic system 15 with voltage supply and evaluation circuit is also contained in the housing 14. This will be described in detail hereinbelow. The connecting lines shown with the reference numerals 16 for the operation of the laser diode 9, reference numeral 17 for the wiring of the electrode segments 2, 3, 4, reference numeral 18 for the wiring of the inner cylinder 5 acting as counter electrode, and reference numeral 19 for the supply and control of actuator motors 20, 20' are to be understood in merely diagrammatic terms.

In the illustrative embodiment shown, the beam platform 7 is mounted in adjustable fashion in the housing 14. To this end, it rests in the first instance on a sphere 21 on a housing projection and is additionally carried by spindles 22, 22' of the actuator motors 20, 20'. The arrangement of the actuator motors 20, 20' and of the sphere 21 are also shown in the plan view of FIG. 1.

Upon an adjustment of the spindle 22, the beam platform 7 tilts about the axis 23. Upon an adjustment of the spindle 22', the tilting takes place about the axis 24 and upon adjustment of the spindles 22, 22' the beam platform 7 tilts about the axis 25. The spindles can be adjusted by means of the motors until such time as the inner cylinder 5 swings freely.

Figure 3:
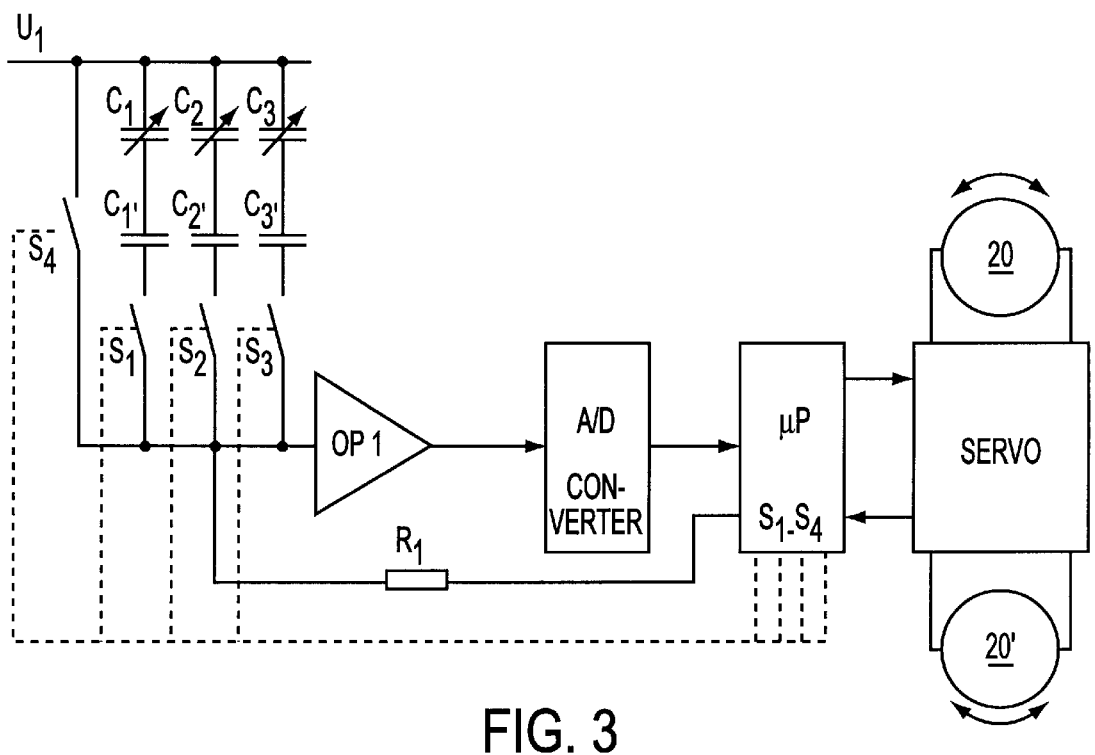
FIG. 3: shows a block circuit diagram concerning the obtaining of the actuation signals

A block circuit diagram of the measurement and control electronic system is indicated in FIG. 3. The capacitances, which are dependent upon the pendulum position, between the electrode segments 2, 3, 4 and the inner cylinder 5 are represented as variable capacitances $C_1$, $C_2$, $C_3$, As has already been mentioned hereinabove, basic capacitances $C_1'$, $C_2'$, $C_3'$ are connected in series with the electrode segments, in order to guarantee a measurable capacitance, even when the inner cylinder is resting on the electrode segments. The basis capacitances are, in their values, approximately 100 times greater than the measurement capacitances $C_1$, $C_2$, $C_3$.

The capacitances can be connected to a charging voltage and an operational amplifier OP1 via controllable switches $S_1, S_2, S_3$ and a resistor R1. The capacitor system can be set to a common voltage potential $U_1$ via a further controllable switch $S_4$. Expediently, this voltage is applied to the inner cylinder 5. Since the latter is connected electrically to the housing 14 via its pendulum wires 12, the housing mass is chosen as the common potential.

An AD converter and a microprocessor $\mu P$ are connected downstream of the operation amplifier OP1 acting as a highly resistive impedance converter. The microprocessor controls both the switches $S_1$ to $S_4$ and also servo drives for the motors 20, 20' and the measurement sequence.

Figure 4:
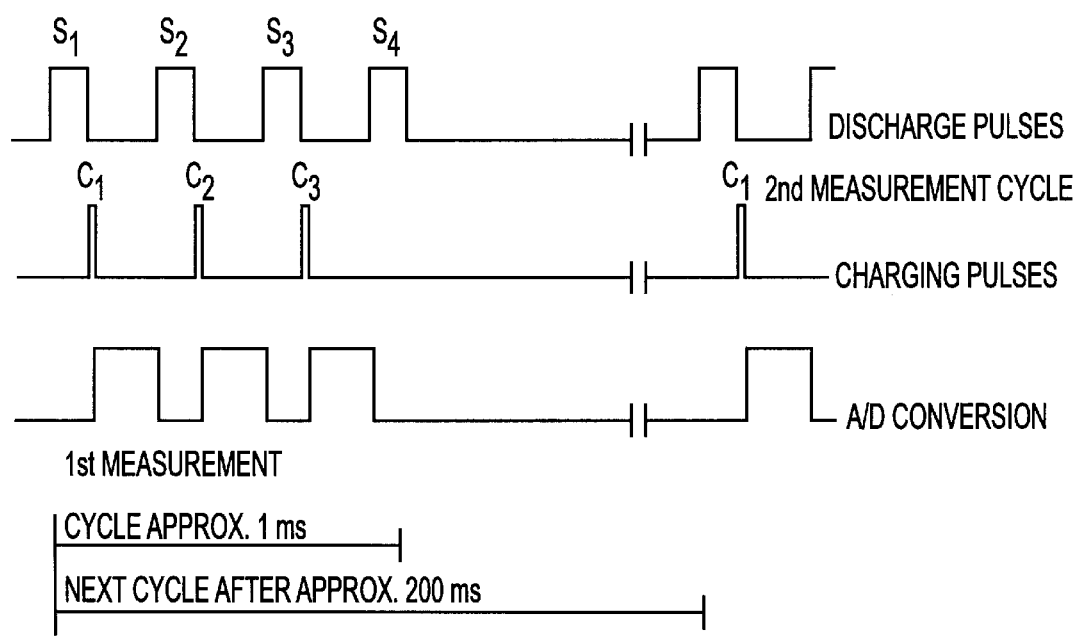
FIG. 4: shows a representation of the temporal progression of the capacitance measurement.

The temporal progression of the measurement is shown in FIG. 4. In the event of a signal at logic level "High", in each case one switch is closed and in the event of a signal at logic level "Low" one switch is open. Prior to each measurement, the compensator capacitances are discharged. To this end, the switches $S_1$ to $S_4$ are closed for the duration of approximately 200 $\mu s$. During this time, the capacitors $C_1, C_2, C_3$ become discharged. Thereafter, all capacitor connections are at the voltage $U_1$, which is usually equal to 0.

Thereafter, the switches $S_2, S_3, S_4$ are opened and only the switch $S_1$ remains closed. Via the resistor R1, a charging pulse of approximately 2 $\mu s$ (low level) is generated. In these 2 $\mu s$, as a function of the capacitance $C_1$ and the resistor R1, the charging voltage at the capacitor $C_1$ falls as compared with $U_1$ in accordance with an e function constantly to a negative potential. However, as soon as the charging pulse is terminated the voltage across $C_1$ remains at a stable value. The voltage of $C_1$ is fed to the AD converter via the highly resistive impedance converter circuit OP1.

After termination of the charging pulse, the AD conversion is started and lasts for approximately 100 $\mu s$. The microprocessor $\mu P$ interrogates the AD-converted voltage values in digital form and stores them. Now, the discharge of the capacitor system is repeated by closing the switches $S_1$ to $S_4$. Thereafter, by opening the switches $S_1, S_3, S_4$ it starts the measurement of the capacitance $C_2$ and correspondingly for $C_3$. The entire measurement cycle lasts for approximately 1 ms. In this time, the pendulum position of the inner cylinder can be assumed to be stable, by reason of the damped suspension.

From the three voltage values of $C_1, C_2, C_3$ the $\mu P$ determines the signal conditioning for the servo unit of the actuator motors. The signal conditioning does not require any electrical balancing of the measuring elements, but consists essentially of a relative comparison of the measured capacitance values in accordance with the following mode of procedure.

The $\mu P$ establishes at which electrode segment of the outer cylinder the inner cylinder is resting (maximum capacitance) and which has the greatest spacing (minimum capacitance). In the case of the three electrode segments, in the initial condition the inner cylinder will always rest at least on one segment, and from one it will have a maximum air spacing. The motors 20, 20' are driven in succession or jointly in such a way that a tilting of the beam platform is generated, which moves the electrode segment having the greatest measured capacitance in each instance away from the oscillating inner cylinder. Depending upon how far the pendulum compensator is distant from the optimal, freely swinging position, the speed of actuation of the motors c an be controlled.

It has proved to be advantageous if the measurement cycle is repeated in fixed time intervals of approximately 200 ms in each instance. In the time therebetween, the motors can work on the leveling of the beam platform. A typical leveling procedure lasts for approximately 30 s, so that by means of a plurality of measurements the actuation procedure can be checked and corrected. The ideal leveling position is reached when all three capacitors have the same capacitance value within a desired tolerance range.

By way of deviation from the illustrative embodiment shown, the actuation signals derived from the capacitor system can of course be also optically displaced and used for manual leveling by means of foot setting screws. Likewise, servo motors which are controlled by the actuation signals can be Incorporated into the foot setting screws.

When leveling has been accomplished, the system described in the illustrative embodiment can also be employed for the permanent monitoring of the leveling. In general, longer time intervals for the measurement cycle are sufficient for monitoring. Only significant alterations to the capacitance values need lead to a resetting of the beam platform.

What is claimed is:

1. Laser leveling instrument with a beam platform that can be leveled and fine self-leveling of a laser beam, having an inner cylinder which is oscillatingly suspended in an outer cylinder and to the lower end of which orientation elements are secured, comprising:

a capacitor system having electrode surfaces which are situated opposite to one another formed by the outer cylinder and the inner cylinder;

means for providing a measurable capacitance when the inner cylinder and outer cylinder come in contact; and a compensator circuit for measuring said measurable capacitance when the inner cylinder and outer cylinder come in contact;

wherein one of the electrode surfaces is segmented, with a separation of extending in the direction of a beam axis, wherein the outer cylinder is vertically connected to the beam platform centrally to the beam axis, and wherein the capacitor system derives signals for detection of a pendulum position of the inner cylinder and wherein the means for providing a measurable capacitance prevents an electrical short circuit when the inner cylinder and outer cylinder come in contact.

2. Laser leveling instrument according to claim 1, wherein at least three identical segments are provided.

3. Laser leveling instrument according to claim 1, wherein the electrode surface of the outer cylinder is segmented.

4. Laser leveling instrument according to claim 1, wherein an electrode surface of a cylinder comprises an electrically insulating coating.

5. Laser leveling instrument according to claim 1, wherein a fixed basic capacitance is connected in series with each of the electrode segments.

6. Laser leveling instrument according to claim 5, wherein the basic capacitances are about 100 times greater than measured capacitances.

7. Laser leveling instrument according to claim 1, further comprising a measurement channel for a serial measurement of variable capacitances.

8. Laser leveling instrument according to claim 1, wherein the beam platform is mounted in levelable fashion within the laser leveling instrument housing, and further includes:

actuator motors adjusting the beam platform as a function of the signals of the capacitor system.

9. Laser leveling instrument according to claim 1, wherein the means for providing a measurable capacitance includes a solid dielectric coating integrally formed in one of the surfaces.

10. Laser leveling instrument according to claim 9, wherein the means for providing a measurable capacitance includes a solid dielectric coating integrally formed in opposing surfaces between the inner and outer cylinders.

11. Laser leveling instrument according to claim 1, wherein the means for providing a measurable capacitance yields a finite capacitance when the inner cylinder and outer cylinder are in contact.

12. A laser leveling instrument, comprising:

a levelable beam platform;

a capacitor system with electrode surfaces situated opposite one another formed by an inner cylinder and an outer cylinder, the inner cylinder oscillatingly suspended in the outer cylinder;

a dielectric coating formed in at least one of said cylinder surfaces such that a non-zero capacitance is measurable when the inner cylinder and outer cylinder come in contact; and a compensator circuit for measuring said non-zero capacitance when the inner cylinder and outer cylinder come in contact;

wherein at least one of the electrode surfaces is segmented, with a separation of segments extending in the direction of a beam axis, wherein the outer cylinder is vertically connected to the beam platform centrally to the beam axis, and wherein the capacitor system derives signals for detection of a pendulum position of the inner cylinder.

13. The laser leveling instrument according to claim 12, wherein at least three identical segments are provided.

14. The laser leveling instrument according to claim 12, further comprising:

a fixed capacitor connected in series with each of the electrode segments.

15. A laser leveling instrument, comprising:

a levelable beam platform; and a capacitor system with electrode surfaces situated opposite one another formed by an inner cylinder and an outer cylinder, the inner cylinder oscillatingly suspended in the outer cylinder;

wherein at least one of the electrode surfaces is segmented, with a separation of segments extending in the direction of a beam axis, wherein the outer cylinder is vertically connected to the beam platform centrally to the beam axis, wherein the capacitor system derives signals for detection of a pendulum position of the inner cylinder, and wherein a fixed basic capacitor is connected in series with each of the electrode segments such that a non-zero capacitance is measurable when the inner cylinder and outer cylinder come in contact.

\* \* \* \* \*